July 29, 1952 A. W. FRIEND 2,605,410

PULSE-TIME DISCRIMINATOR

Filed Aug. 27, 1946

INVENTOR
ALBERT W. FRIEND
BY H. S. Grover
ATTORNEY

UNITED STATES PATENT OFFICE 2,605,410

PULSE-TIME DISCRIMINATOR

Albert W. Friend, Cambridge, Mass., assignor to Radio Corporation of America, a corporation of Delaware Application August 27, 1946, Serial No. 693,321

5 Claims. (Cl. 250—27)

This invention relates to discriminator circuits and more particularly to a time discriminator for signal pulses.

In the use of electronic devices, it often becomes necessary to resolve a train of signal pulses into intelligence either in the form of a synchronous control or the expression of information.

The use of a train of signal pulses for synchronization control takes a very important role in the transmission of optical images. Television systems of the general character of that disclosed in the patent to Arthur W. Vance, No. 2,137,039, dated November 15, 1938, and assigned to the Radio Corporation of America, include a cathode ray tube with horizontal and vertical ray deflecting coils, a horizontal deflection system for causing a sawtooth current wave at the desired line scanning frequency to pass through the horizontal ray deflecting coils, and a vertical ray deflection system for causing a sawtooth current wave at the desired framing frequency to pass through the vertical ray deflecting coils.

In order to provide synchronism between the scanning of the transmitting system and the receiving system, an oscillator is utilized to generate sharp voltage peaks, and its oscillation frequency is locked in step with operating action at the transmitting station by transmitted synchronizing impulses which are applier to the oscillating circuit at the receiver. The tips of the voltage peak referred to which occur at the ends of each of the scanning periods are utilized to drive the horizontal deflection system.

Deviation from synchronization will cause distortion of the reproduced image.

According to this invention, an improved method and means are provided to control the timing of the image scanning by the cathode ray beam.

Intelligence is transmitted through space by modulation of a signal carrier, for example, a radio frequency signal wave, transmission of the carrier, and demodulation of the carrier at the receiving station. Modulation is the process of altering a radio frequency signal wave in accordance with the intelligence to be transmitted.

A continuous radio frequency wave possesses three definite characteristics—amplitude, frequency and phase. A signal is said to be frequency modulated when the amplitude of the signal carrier remains constant and the frequency of the carrier is modulated in accordance with the transmitted intelligence.

Instead of modulating a frequency of the carrier directly as is done in the conventional frequency modulation system, it is possible to make use of a subcarrier. For example, if a 1 mc. carrier is amplitude modulated at 100 kc. to provide a subcarrier, and the latter is frequency modulated, an indirect method of frequency modulation results.

There are certain ultra high frequency and microwave tubes such as the magnetron which are not easily frequency modulated directly, and amplitude modulation of such tubes is limited to a very low percentage, if distortion is to be held within tolerable limits. However, such tubes can be amplitude modulated fully with square waves. Such operation is essentially the same as on-off keying.

A square wave subcarrier may be substituted for the sine wave subcarrier as a vehicle for the frequency modulated intelligence with but little difference in result, except for increased band width.

Frequency modulation of a comparatively low frequency square wave is accomplished easily. The system exhibits the same advantages as regards to noise reduction as does the conventional frequency modulation system.

The train of square waves may be considered as a series of rectangular pulses wherein the pulse length is equal to the time between pulses. Now, if the pulses are shortened and the repetition rate maintained, the same average power may be considered to deliver a much greater effective signal strength. The frequency modulation of the pulses will result in a modulation of the timing of the pulses. Such a system is called pulse-time modulation.

Pulse-time modulation provides all the advantages of subcarrier frequency modulation, and at the same time provides an effective power gain when tubes are employed which are capable of very high peak power, but not much average power. Most magnetrons fall into the latter category because of the limited amount of power that may be dissipated safely in the anode. Pulse-time modulation offers many other advantages in relay and multi-channel operation.

The pulse-time modulation receiver must demodulate by discriminating the timing of the pulses.

According to this invention, an improved method and means are provided for demodulating time modulated pulses.

In common communication systems, channeling is accomplished by means of frequency discrimination. In a pulse-time modulation system, channeling is accomplished in an entirely different manner by a division of time along a basic time interval.

For purposes of explanation, let there be selected a basic time interval of 100 microseconds. Short pulses may be transmitted to a receiving system completely at any part of this time interval, for example, a complete pulse may be exchanged in the first tenth of the interval, that is, the first 10 microseconds. The 100 microsecond interval accordingly may be divided into a number of shorter intervals, say of 10 microseconds each.

It will be seen that if the pulse occurs completely in one 10 microsecond interval of the basic time interval of 100 microseconds, the receiving system would be idle during the other 90 microseconds. However, other pulses might easily be delivered during any of the other 10 microsecond intervals. It is obvious that each of several receiving systems may be made responsive to a particular one of these 10 microsecond intervals but not to the other. In this way a channeling system based upon time division will be obtained.

In practical pulse-time modulation systems, one channel is reserved for synchronizing pulses, thus in a 100 microsecond basic time interval, the first 10 microsecond sub-interval might be the synchronizing pulse. A receiving circuit would be arranged to receive pulses in any of the channels by making it responsive only during the selected sub-interval as well as to the special synchronizing pulses arriving in the first sub-interval. Such action may be secured by means of vacuum tube gating circuits of the biased multivibrator type which keep the receiver inoperative except during the desired reception sub-intervals.

According to this invention, a new and improved method and means are provided for selecting the desired sub-interval in a pulse-time modulation system.

The primary object of this invention is to provide an improved pulse-time discriminator.

Another object of this invention is to provide an improved synchronization circuit.

Still another object of this invention is to provide an improved synchronizing circuit for a television system.

A further object of this invention is to provide an improved signal communication system.

A still further object of this invention is to provide an improved circuit for the discrimination of pulse-time modulation.

Other and incidental objects of the invention will be apparent to those skilled in the art from a reading of the following specification and an inspection of the accompanying drawing in which Figure 1 shows schematically this invention in one of its preferred forms;

Figures 1, 2, 3, 4, 5:
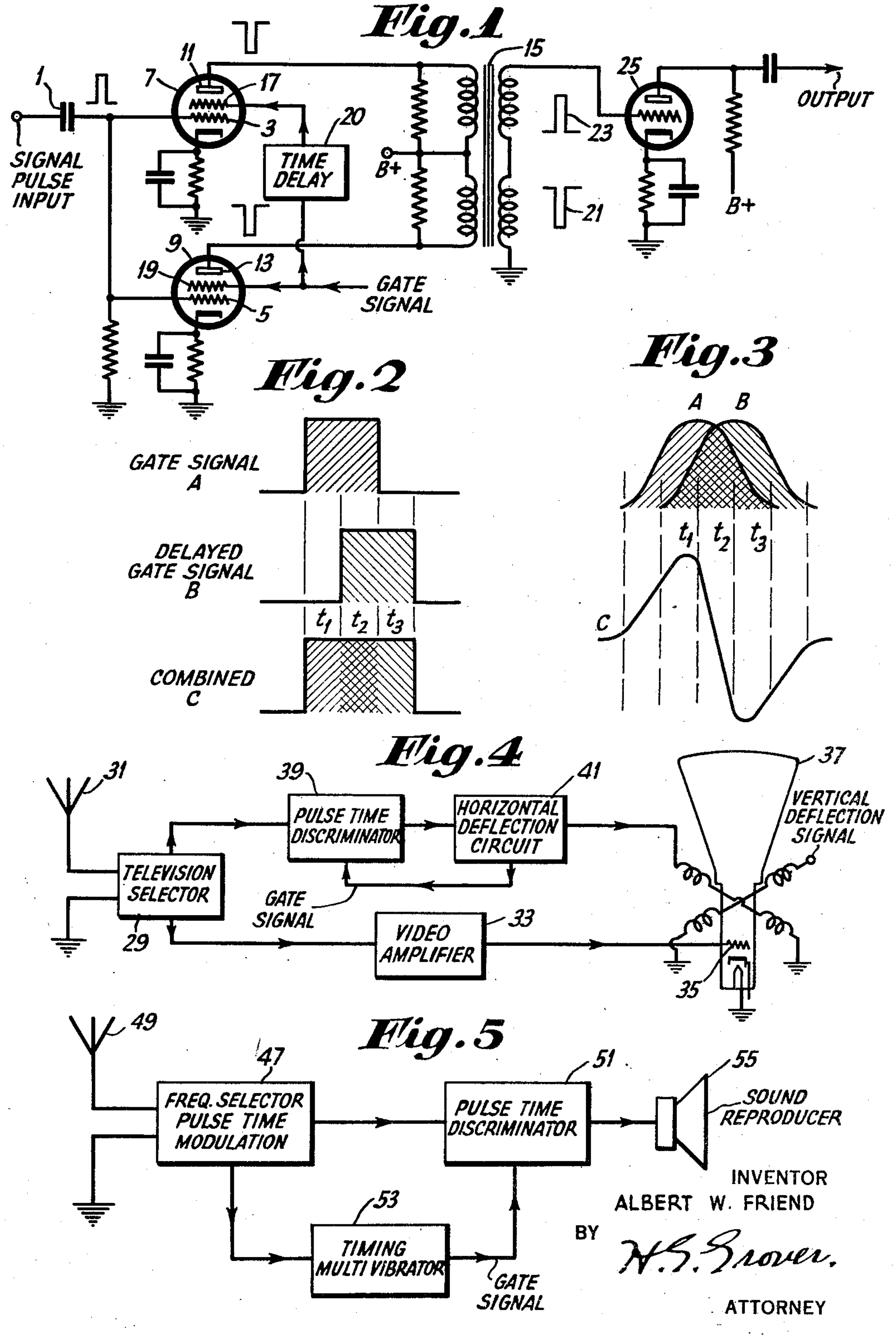
Figures 2 and 3 shows graphically curves illustrating the operation of this invention.
Figure 4 shows in block diagram a system employing this invention in one of its preferred forms.
Figure 5 shows by block diagram a system involving this invention in another of its preferred forms.

Referring now in detail to Figure 1, there is shown an input circuit including condenser 1 which is adapted to receive a train of signal pulses, for example, a train of synchronizing pulses employed in the synchronization of scanning operations. The signal pulses are applied to control electrodes 3 and 5 of electron discharge devices 7 and 9 respectively. It will be noted that control electrodes 3 and 5 are connected together, so that the input signals are applied to the tubes 7 and 9 in phase.

Discharge devices 7 and 9 contain anodes 11 and 13, which are connected in push-pull through transformer 15.

Electron discharging devices 7 and 9 each contain another control electrode 17 and 19. Control electrodes 17 and 19 are adapted to receive a gate signal voltage which, with suitable tube bias voltage, will permit tubes 7 and 9 to be operative only during time periods when the gate signal voltage is applied on electrodes 17 and 19.

A gate signal voltage may be derived from a deflection signal generator of the type employed in television systems, such as, for example, the deflection circuit shown and described in the Reissue Patent No. 20,338 issued to W. A. Tolson and dated April 20, 1937. The gate signal referred to may also be derived from a biased multivibrator circuit. It is essential for the proper functioning of this invention that the timing of the gate signal coincide with the timing of the input signal pulse, whether the timing of the gate signal be derived from a deflection circuit of a television system or from an auxiliary multivibrator circuit.

It is important that the applications of the gate signal to each of the electron discharge devices 7 and 9 recur at the same frequency and be overlapping in time interval, but not simultaneous. This causes the discharge devices 7 and 9 to be operative only during overlapping, but not simultaneous, time intervals recurring at the frequency of the input signal pulse.

By passing the original gate signal through a time delay circuit 20 and applying the gate signal to electrode 19 before delay and to electrode 17 after delay, electron discharge devices 7 and 9 may be made operative only during periodic, overlapping, but not simultaneous, time intervals.

It will be seen that, because of the push-push connections of discharge devices 7 and 9, no signal would pass through the circuit including the discharge devices 7 and 9 and transformer 15, if both the discharge devices 7 and 9 were continuously operative. This is because the signal output of each of the discharge devices 7 and 9 is in phase opposition.

Because the application of the gate signal makes the discharge devices 7 and 9 operative only during overlapping, but not simultaneous, signal periods, the signal produced in the output circuit of transformer 15 will be dependent upon the time of arrival of the signal pulse at the input circuit with respect to the controlling gate signal.

Such action will be more evident upon an examination of the curves shown in Figure 2. Curve A represents a gate signal. The same gate signal delayed by a predetermined amount of time is shown in curve B. Curve C represents the combination of the original gate signal shown in curve A with the delayed gate signal shown in curve B.

If the incoming signal pulse occurs during time interval $t_1$, only tube 9 will be operative and a pulse signal will be produced in the output circuit of transformer 15. The output signal in the transformer 15 will take the form of a negative pulse, as indicated by 21. If, however, the incoming signal pulse occurs during time interval $t_2$, at which time both discharge devices 7 and 9 are operative, no signal pulse will occur in the output circuit of transformer 15, because of the push-push action of the circuit in balancing out the amplified signal pulses.

If, however, the incoming signal pulse occurs during time interval $t_3$, at which time only electron discharge device 7 is operative, a positive signal pulse 23 will occur in the output circuit of transformer 15.

It follows that no signal will be produced in the output circuit of transformer 15 as long as the gate signal timing is such that the incoming signal pulse occurs during time interval $t_2$, however, if the timing of the gate signal is delayed such that the incoming signal pulse occurs during time interval $t_1$, a voltage occurs in the output circuit of transformer 15 having a negative polarity. As is known in the art, such a pulse can be used for changing the timing of the gate signal generator to bring it up in step. Likewise, if the gate signal advances in time such that the incoming signal pulse occurs during time interval $t_3$, a signal voltage of the opposite polarity is produced in the output circuit of transformer 15 and may be used to delay the timing of the gate signal generator. If follows that a system involving the use of this invention in one of its preferred forms acts to maintain synchronism.

Amplifying tube 25 is connected to the secondary of transformer 15 and provides an amplified energy pulse. As illustrated, the output is taken in the plate circuit of tube 25, but it could be taken from the cathode circuit.

The circuit shown in Figure 1 corresponds to the "pulse time discriminator" shown in block in Figure 4 and Figure 5. The gate signal illustrated in Figure 1 will be developed in the "horizontal deflection circuit" following and shown in block in Figure 4. The gate signal may also be developed in a timing multivibrator, as shown in Figure 5.

Turning now to Figure 3, there is shown by curve A another form of gate signal which may be used in the practice of another preferred form of this invention. By passing the gate signal represented by curve A through a delay circuit, curve B results. If the curve B representative of the delayed gate signal is subtracted from the curve A representative of the undelayed gate signal, curve C will result.

By properly adjusting the shape of the gate signal, a curve having the straight portion during time interval $t_2$ is obtained.

It follows that if the incoming signal pulse always occurs during time interval $t_2$, a signal will be obtained in the output of transformer 15 representative of the time of occurrence of the pulse during time interval $t_2$. If, for example, the incoming signal pulse occurs at the beginning of the time interval $t_2$, the signal output of electron discharge device 9 will be greater than that of electron discharge device 7. This will result in a negative pulse in the output circuit of transformer 15. If the incoming signal pulse occurs at the middle of time interval $t_2$, both discharge devices 7 and 9 will be equally operative and the signal produced by each of the discharge devices will cancel each other out so that no signal pulse will occur in the output circuit of transformer 15. If, however, the signal pulse occurs at the end of time interval $t_2$, electron discharge device 7 will be more operative than electron discharge device 9, and therefore a positive pulse will occur in the output circuit of transformer 15.

Turning now to Figure 4, there is shown in block diagram a television system employing this invention in one of its preferred forms. A television selector 29 obtains signal energy from antenna 31 and passes the image signal through the video amplifier 33 to the control electrode 35 of the image tube 37. Television selector 29 may, for example, be of the type shown and described in the reissue patent to W. L. Carlson, No. 20,700, dated April 19, 1938.

The television selector 29 also furnishes signal energy comprising the horizontal scanning line synchronizing pulses to pulse-time discriminator 39, which may take the form shown in the circuit diagram contained in Figure 1. The pulse-time discriminator 39 is connected to the horizontal deflection circuit 41 which may, for example, take the form of the deflection circuit shown and described in the Reissue Patent No. 20,338 issued to W. A. Tolson and dated September 30, 1937.

In accordance with the detailed description under Figure 1 above, the synchronizing signal pulse applied to the input circuit of the pulse-time discriminator 39 will cause a pulse signal in the output of pulse-time discriminator 39 whose polarity is dependent upon the timing of the signal pulses with respect to a gate signal which, in accordance with the form of the invention shown in Figure 4, may be derived from the horizontal deflection circuit 41.

If the horizontal deflection circuit 41 is running in perfect timing with the synchronizing signal input pulse, no controlling voltage will be furnished the horizontal deflection circuit 41 by the pulse-time discriminator 39. However, if the timing of the horizontal deflection circuit should change such that it is ahead of the synchronizing signal pulse timing, a negative pulse will be fed the horizontal deflection circuit 41. This negative pulse can be employed to delay the timing of the horizontal deflection circuit 41. Likewise, if the timing of the horizontal deflection circuit 41 lags the synchronizing pulse input signal, a positive pulse will be furnished the horizontal deflection circuit 41 and such a positive pulse may be employed to speed up the timing of the horizontal deflection circuit 41. It follows that horizontal deflection circuit 41 will remain in step with the synchronizing pulse input signals.

Turning now to Figure 5, there is shown a communication system employing pulse-time modulation.

A frequency selector 47 for pulse-time modulated signals is connected to antenna 49 and transmits signal energy to pulse-time discriminator 51. A timing multivibrator 53 derives its initial pulse from a frequency selector 47. The synchronizing pulse may be, for example, the first pulse in a series of pulses as referred to above. The timing multivibrator 53 is adjusted to produce an output signal taking the shape of that shown by curve A in Figure 3. The pulse-time discriminator 51 includes the time delay circuit necessary to provide a similar pulse delayed in time in order to provide an overlapping, but not simultaneous, pulse B. The resultant series of pulses furnished to sound reproducer 55 will be time discriminated in accordance with the time of arrival such as to produce intelligence in sound reproducer 55.

The timing multivibrator 53 may, of course, be adjusted such that the pulse-time discriminator 51 will operate only during any predetermined time interval. Only that time interval selected will actuate the sound reproducer 55 because of the balancing effect of pulse-time discriminator tubes explained in detail above under Figure 1.

Having thus described my invention, what is claimed is:

1. A television deflection system comprising in combination, a source of synchronizing pulses, a deflection signal generator having an output circuit, a pair of electron discharge devices connected in push-push and each having a pair of control electrodes, a connection between said source of synchronizing pulses and one of said control electrodes of each of said electron discharge devices, a connection of substantially no time delay between said deflection signal generator output circuit and another control electrode of one of said electron discharge devices, a time delay circuit, and a connection through said time delay circuit between said deflection signal generator output circuit and another control electrode of the other of said electron discharge devices.

2. A synchronizing circuit comprising in combination, a source of synchronizing pulses and a source of pulses to be controlled, means for controlling the frequency of said source of pulses to be controlled comprising a first and second electron discharge device each having a first and second control electrode, the output circuits of said electron discharge devices being connected in push-pull, a connection between said source of synchronizing pulses and said first control electrode of both of said discharge devices, a connection between said source of pulses to be controlled and the second control electrode of said first discharge device, a time delay circuit, the time delay of said time delay circuit being less than the time duration of one of said pulses, a connection between said source of pulses to be controlled and the second control electrode of said second discharge device through said time delay circuit, and a coupling between said push-pull output circuits and said frequency control means.

3. A synchronizing circuit comprising in combination, a source of synchronizing signals and a source of signals to be controlled, means for controlling the frequency of said source of signals to be controlled comprising a first and second electron discharge device each having a first and second control electrode, the output circuits of said electron discharge devices being connected in push-pull, a connection between said source of synchronizing signals and said first control electrode of both of said discharge devices, a connection between said source of signals to be controlled and the second control electrode of said first discharge device, a time delay circuit, a connection between said source of signals to be controlled and the second control electrode of said second discharge device through said time delay circuit, and a coupling between said push-pull output circuits and said frequency control means.

4. A synchronizing signal input terminal, a synchronizing control voltage output terminal, a frequency controlled signal terminal, a first and second electron discharge device each having a first and second control electrode, the output circuits of said electron discharge devices being connected in push-pull, a connection between said synchronizing signal input terminal and said first control electrode of both of said discharge devices, a connection between said frequency controlled signal terminal and the second control electrode of said first discharge device, a time delay circuit, a connection between said frequency controlled signal terminal and the second control electrode of said second discharge device through said time delay circuit, and a connection between said push-pull output circuits and said synchronizing control voltage output terminal.

5. A first periodically recurring signal input terminal, a second periodically recurring signal input terminal, a synchronizing control voltage output terminal, a first and second electron discharge device each having a first and second control electrode and an output circuit, the output circuits of said electron discharge devices being connected in push-pull, a connection between said first signal input terminal and the first control electrode of both of said discharge devices, a connection between said second signal input terminal and the second control electrode of said first discharge device, a time delay circuit, a connection between the second signal input terminal and the second control electrode of said second discharge device through said time delay circuit, and a coupling between said push-pull output circuits and said synchronizing control voltage terminal.

ALBERT W. FRIEND.

REFERENCES CITED

The following references are of record in the file of this patent:

UNITED STATES PATENTS

| Number | Name | Date |
|---|---|---|
| 2,104,801 | Hansell | Jan. 11, 1938 |
| 2,403,975 | Graham | July 16, 1946 |
| 2,405,238 | Seeley | Aug. 6, 1946 |
| 2,426,225 | Krause | Aug. 26, 1947 |
| 2,427,523 | Dolberg | Sept. 16, 1947 |
| 2,433,667 | Hollingsworth | Dec. 30, 1947 |
| 2,462,110 | Levey | Feb. 22, 1949 |